United States Patent [19]

Myers

[11] 4,087,698

[45] May 2, 1978

[54] ALTERNATING CURRENT POWER GENERATING SYSTEM

[75] Inventor: John E. Myers, Littleton, Colo.

[73] Assignee: Franklin W. Baumgartner, Denver, Colo.

[21] Appl. No.: 789,853

[22] Filed: Apr. 22, 1977

[51] Int. Cl.² .................... H02K 19/34; H02K 19/36
[52] U.S. Cl. ..................................... 307/84; 310/122; 322/32
[58] Field of Search ............... 307/84, 72, 73; 310/10, 310/13, 112, 113, 114, 116, 118, 122; 322/32, 63; 290/4 A, 4 R

[56] References Cited

U.S. PATENT DOCUMENTS

| | | | |
|---|---|---|---|
| 1,971,818 | 8/1934 | Hoxie | 307/53 |
| 2,039,322 | 5/1936 | Lell | 318/172 |
| 2,061,983 | 11/1936 | Rossman | 318/47 |
| 2,782,329 | 2/1957 | Kirby | 307/72 |
| 3,070,740 | 12/1962 | Chirgwin | 322/32 |
| 3,421,061 | 1/1969 | Baughman | 318/172 |

FOREIGN PATENT DOCUMENTS

| | | | |
|---|---|---|---|
| 952,340 | 5/1949 | France | 310/122 |
| 280,888 | 10/1927 | United Kingdom | 310/122 |

Primary Examiner—L. T. Hix
Assistant Examiner—Stafford D. Schreyer
Attorney, Agent, or Firm—Sheridan, Ross, Fields & McIntosh

[57] ABSTRACT

A system for generating alternating current of selected voltage at a target frequency includes a plurality of A.C. generators, at least one of which has a rotatably mounted stator. A prime mover drives a power input shaft at speeds extending through a wide range and the shaft is connected to the first rotor. As speed increases, the generator reaches the desired frequency and a sensing device releases the stator to rotate and maintain a relative speed between itself and the rotor corresponding to the target frequency. The stator drives the second rotor at its own absolute speed which is the difference between the power input shaft speed and the relative speed between the first stator and rotor. A field control maintains the desired voltage and a load control transmits the current output to a load and varies the load to maintain the generator at proper operating condition.

23 Claims, 4 Drawing Figures

ALTERNATING CURRENT POWER GENERATING SYSTEM

BACKGROUND OF THE INVENTION

The system and method of this invention lie in the field of alternating current generation with controlled voltage and frequency to enable connection to a power supply system carrying current at predetermined voltage and frequency. They are directed particularly to the utilization of a prime mover which drives a power input shaft at widely varying speeds with a range extending well above that necessary to produce current at selected voltage and target frequency, which shaft drives one or more generators without modifying control of the shaft speed.

Various schemes have been proposed and utilized for driving and controlling the speed of motors and generators and have been generally satisfactory for the purpose. In the field of electrical current generation the output frequency of the generator has been maintained at a desired value, and hence the angular velocity of the rotor, by comparing the generated frequency with a standard reference frequency and modifying the rotational speed of a driving turbine to cause them to match. Other systems have maintained the proper angular velocity of the rotor by interposing a mechanical variable speed transmission in the drive line between a prime mover and the rotor shaft. It has also been proposed to control the speed of an induction motor by rotating its frame, or stator, at different speeds, an auxiliary motor being used to produce the rotation of the frame. Among examples of these various types of devices might be mentioned the U.S. Pat. Nos. 1,971,818 to Hoxie, 2,039,322 to Lell, and 2,061,983 to Rossman.

While systems such as those mentioned are well suited to installations in which stored energy is used for the power supply and hence the power may be reduced without waste of energy, they are not practical for use when the source of energy cannot be stored and varies over a wide range, such as relative wind driving windmills or air turbines. If the full energy is not used it is lost and cannot be recovered at a later time.

SUMMARY OF THE INVENTION

The apparatus incorporating the features of the present invention overcomes the disadvantages mentioned above and provides a relatively simple system for utilizing all of the energy available from an uncontrolled prime mover which may operate at widely varying speeds.

Generally stated, the system in preferred form includes at least two alternating current generators with the stator of the first generator connected in driving relation to the rotor of the first generator and a power input shaft connected in driving relation to the first rotor, the shaft being adapted to be driven by a prime mover which may be a windmill or wind turbine capable of rotating the shaft at speeds in a range extending well above that required for production of current from a single generator at selected voltage and a target frequency. The first stator is rotatably mounted but is initially releasably locked against rotation. In the event that the power and speed of the drive shaft are great enough the second stator may be rotatably mounted and initially locked in the same way. The second stator may be drivingly connected to a third generator rotor or to a dynamic brake.

The control apparatus may be mounted in a console, and includes a field control assembly, a load control assembly, and a phase lock assembly appropriately interconnected. The load control assembly is selectively connectable to a first or second type of load and controls the load to maintain proper operation of the generator. Each stator shaft is mounted in a bearing which incorporates lock means to prevent rotation of the stator under control of the phase lock assembly. The field control assembly provides the necessary excitation for the rotor field. Separate consoles may be provided for each generator.

In operation, assuming the prime mover to be originally at a standstill, it commences to rotate and drives the power input shaft at increasing speed. The shaft correspondingly drives the first rotor which cooperates with the stationary stator to produce alternating current at increasing frequency. The phase lock assembly compares the output frequency with that supplied by a source of reference voltage and frequency, and when the target frequency is attained, the phase lock assembly releases the bearing lock to allow the first stator to rotate and maintain a relative speed between itself and the first rotor corresponding to the target frequency.

The absolute speed of the first stator is the difference between the speed of the power input shaft and the relative rotational speed between itself and the first rotor. The first stator drives the second rotor at this absolute speed.

At any time when the first generator is producing current below the target frequency, the load control transmits such current to a load which does not require target frequency. When the target frequency is attained the current may continue to be transmitted to this first type of load or it may selectively be transferred to a power supply system carrying current at the target frequency. The second generator operates in the same way, and if the power input shaft speed increases beyond the point where the second stator is released, it may drive a third rotor or a dynamic brake.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
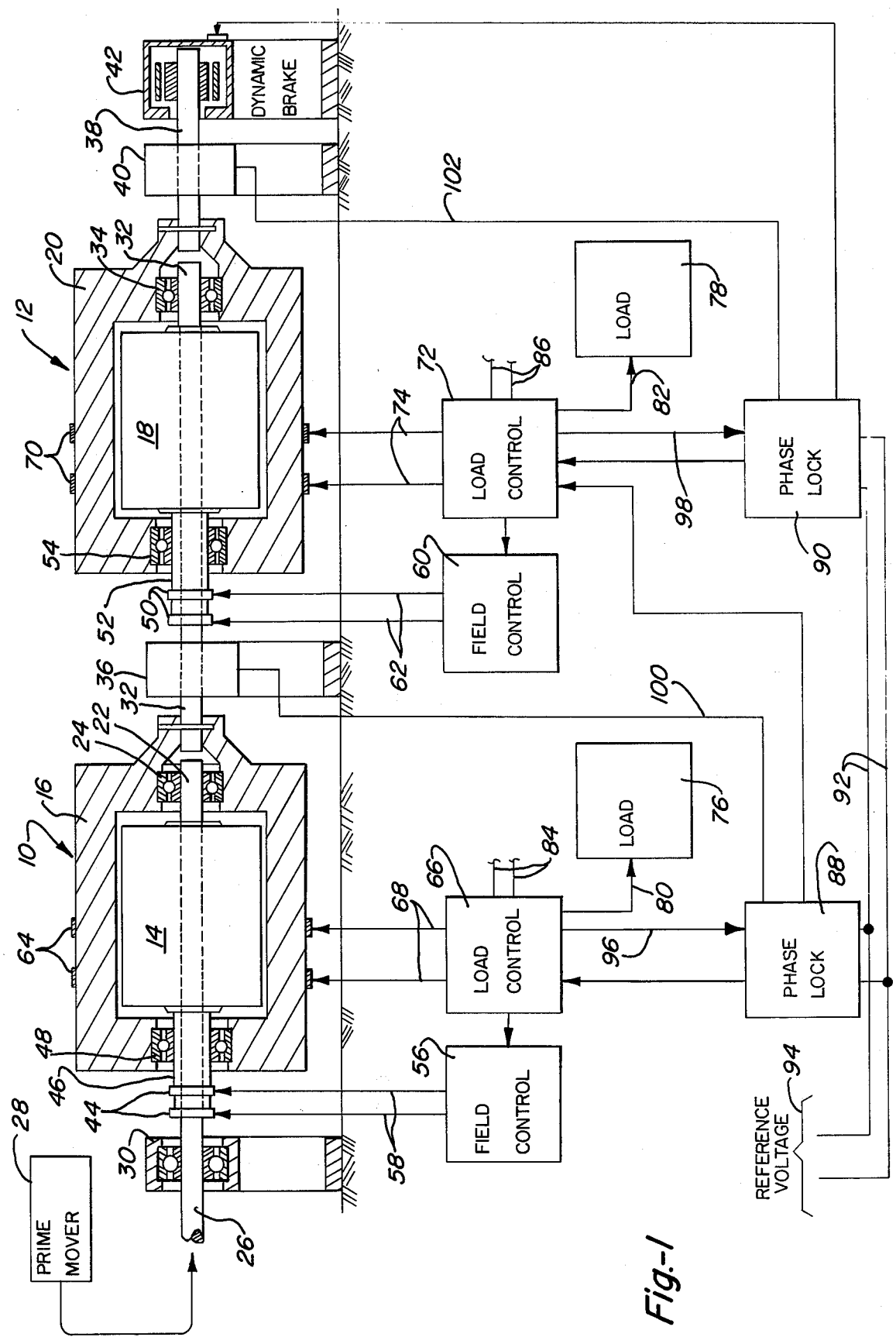
FIG. 1 is a schematic view of the system showing two generators and a dynamic brake.

The general arrangement of a system incorporating the features of the invention is schematically illustrated in FIG. 1, in which two substantially identical generators 10 and 12 are shown arranged in tandem. Generator 10 has a rotor 14 and stator 16 and generator 12 has a rotor 18 and stator 20. Rotor 14 is mounted on shaft 22 which is carried by bearing 24 in one end of stator 16. The outer end of shaft 22 becomes the power input shaft 26 connected to prime mover 28 and carried by bearing 30.

Rotor 18 is mounted on shaft 32 which is carried by bearing 34 in one end of stator 20. The outer end of shaft 32 extends into and is locked to the outer end of stator 16 and is carried by bearing 36. Another shaft 38 extends into and is locked to the outer end of stator 20 and also extends through bearing 40 and into dynamic brake 42. Field slip rings 44 for rotor 14 are mounted in sleeve 46 which is carried by bearing 48 in the end of stator 16. Similar slip rings 50 for rotor 18 are mounted on sleeve 52 which is carried by bearing 54 in the end of stator 20.

Field control 56 is connected by conductors 58 to slip rings 44 and field control 60 is connected by conductors 62 to slip rings 50. Stator 16 is provided with slip rings 64 to carry current from the generator, and load control 66 is connected by conductors 68 to slip rings 64. Stator 20 is provided with slip rings 70 to carry current from the generator, and load control 72 is connected by conductors 74 to slip rings 70. Non-critical loads within 76 and 78 are selectively connectable by load controls 66 and 72 respectively as indicated at 80 and 82. Conductors 84 and 86 lead from load controls 66 and 72 to a standard power transmission system operating at selected voltage and the target frequency and are selectively connectable through the load controls to the outputs of the generators. Phase lock assemblies 88 and 90 are connected through conductors 92 to a source of reference voltage and frequency 94 and through conductors 96 and 98 and the load controls to the outputs of the generators. In addition, each phase lock assembly is connected by conductors 100 and 102 to the locking means, not shown, in bearings 36 and 40 respectively.

In considering the operation of the system, the prime mover 28 is considered to be initially at a standstill and is assumed to be a windmill or wind turbine. When the relative wind velocity is sufficient to produce adequate power the prime mover commences to rotate, driving the power input shaft 26 at increasing speeds. The shaft correspondingly drives rotor 14 which cooperates with stationary stator 16 to produce alternating current at increasing frequency. The rotational speed of rotor 14 may for varying periods of time remain so low that the frequency of the current produced is less than the target frequency. During such periods the current passes through conductors 68 to load control 66 and is distributed to load 76 which is non-critical and can utilize power at non-standard frequencies.

Phase lock 88 continuously monitors the output frequency of the generator through conductors 96 and compares it with that supplied by the reference voltage and frequency source 94. When the target frequency is attained, phase lock 88 releases the lock in bearing 36 by way of conductor 100 and allows stator 16 to rotate and maintain a relative speed between itself and rotor 14 corresponding to the target frequency. The absolute speed of stator 16 is the difference between the speed of the power input shaft 26, and rotor 14, and the relative rotational speed between itself and rotor 14. Stator 16 then drives rotor 18 of the second generator at this absolute speed.

When the target frequency is attained the current may continue to be transmitted to the non-critical first type load 76 if needed or desired, or it may be selectively transferred through conductors 84 to a power supply system carrying current at the target frequency, phase lock 88 serving to lock the generator into the system.

Once stator 16 begins rotation, shaft 32 becomes in effect a power input shaft in the same way as shaft 26, and the operation of generator 12 follows the same pattern as that described for generator 10. When the output of generator 12 reaches the target frequency and stator 20 is released to rotate, it drives shaft 38 and the remaining power is absorbed by dynamic brake 42. In the event that it is known in advance during the engineering and design stages that the relative wind power at the station location will be frequently well in excess of the capacity of two generators, then one or more additional generators may be added to the series, with the stator of the last generator drivingly connected to the dynamic brake.

Figure 2:
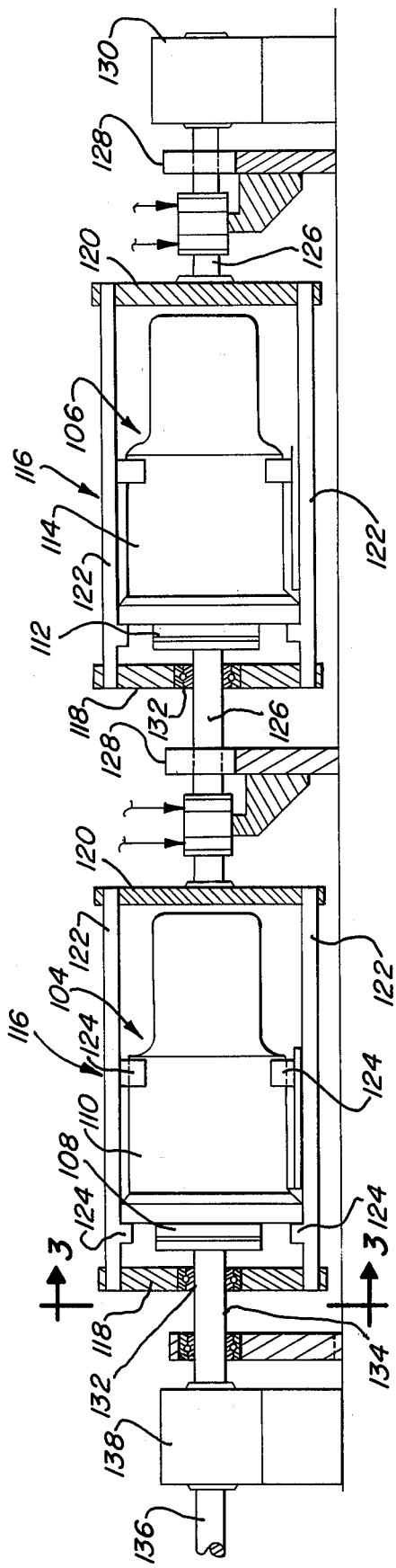
FIG. 2 is a view similar to FIG. 1 showing a modified form of generator and rotatable supporting frame.
Figure 3:
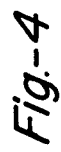
FIG. 3 is a view taken on line 3—3 of FIG. 2.

The apparatus of FIG. 1 is intended primarily for producing current suitable for incorporation into a standard system such as public service network and the stators would be initially designed for the rotatable mounting as shown. If it is desired to provide a relatively small, low power system utilizing standard conventional generators, it may be somewhat modified as indicated in FIG. 2.

In this form, two conventional single bearing AC generators 104 and 106 are provided, such generators being constructed for stationary mounting. Generator 104 has a rotor 108 and a stator 110, and generator 106 has a rotor 112 and a stator 114. Each generator is mounted in a frame 116 consisting of a first disk 118 and a second disk 120 tied together by four beams 122 having projections 124 to fixedly engage and support the stator. Similarly to FIG. 1 each second disk is provided with a shaft 126 supported in a lockable bearing 128. The first shaft 126 drives rotor 112 and the second shaft 126 extends into dynamic brake 130. Disks 118 are carried on bearings 132, one of which is mounted in rotor shaft 126 and the other on rotor shaft 134. Power input shaft 136 drives a step-up, step-down transmission 138 which drives shaft 134 in an appropriate speed range.

Figure 4:
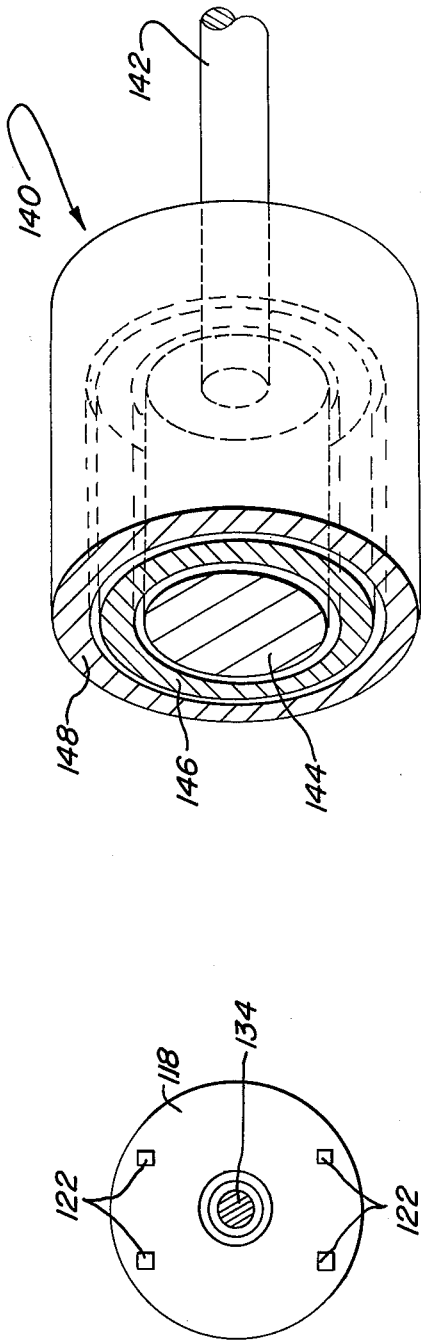
FIG. 4 is an idealized representation of a two generator assembly in a concentric configuration.

FIG. 4 illustrates a concept of a dual generator system in which a second generator is arranged in concentric overlying relation to a first generator. In this figure, the system 140 includes a power input shaft 142 connected to a first rotor 144. Member 146 is a rotatably mounted ring or cylinder carrying an inner winding to serve as a first stator and an outer winding to serve as a second rotor. Member 148 represents the rotatably mounted second stator. A construction of this general nature will be equipped to operate in the same manner as the construction of FIG. 1, and stator 148 would be provided with means to drive an additional rotor or dynamic brake.

What is claimed is:

1. An alternating current power generating system comprising:
   a plurality of alternating current generators, each having corresponding first generating components and corresponding second generating components;
   all of the components being rotatably mounted, with the second components being releasably restrained against rotation;
   a rotatable power input shaft adapted to be driven by a prime mover at widely varying speeds;
   the power input shaft being connected in driving relation to the first component of a first generator, and each second component being connected in driving relation to the first component of a successive generator, with the second component of the last generator in the series being connected in driving relation to a controllable load;
   the range of rotational speed of the power input shaft extending well above that required to produce a selected target frequency in at least one generator;

and sensing and control means operative to selectively and sequentially sense the attainment of the target frequency of the current produced by the first and successive generators and to act in response to the attainment of such frequencies to initially release the second component of the first generator and allow it to rotate and maintain a relative rotational speed between itself and the first component corresponding to the target frequency and to drive the first component of the second generator, and to sequentially release the second components of successive generators as they attain the target frequency.

2. A system as claimed in claim 1; in which
field control means are electrically connected to the field winding of each generator to produce a selected voltage at the target frequency.

3. A system as claimed in claim 1; in which
the sensing and control means include adjustable load control means connecting the output of each generator to a load and operable to vary the load and maintain the proper operating condition of the generator.

4. A system as claimed in claim 3; in which
the load control means is selectively connectable to a first type of load to absorb the output of the generator at less than the target frequency and selected voltage.

5. A system as claimed in claim 3; in which
the load control means is selectively connectable to a second type of load to absorb the output of the generator at the target frequency and selected voltage.

6. A system as claimed in claim 5; in which
the second type of load is a power supply system carrying current at the target frequency and selected voltage.

7. A system as claimed in claim 1; in which
the load to which the second component of the last generator in the series is connected is a dynamic brake.

8. An alternating current power generating system comprising:
first and second alternating current generators, each having a rotor and a stator;
the stator of the first generator being rotatably mounted and connected in driving relation with the rotor of the second generator;
means to releasably lock the stator of the first generator against rotation;
a rotatable power input shaft connected in driving relation to the rotor of the first generator and adapted to be driven by a prime mover at widely varying rotational speeds in a range extending well above that required to produce a selected target frequency in the first generator;
and means operative to sense the attainment of the target frequency of the current produced by the first generator in response to increasing rotational speed of the power input shaft and to act in response to the attainment of the target frequency to release the stator of the first generator and allow it to rotate and maintain a relative rotational speed between itself and the stator corresponding to the target frequency and to drive the rotor of the second generator at a speed corresponding to the difference between the speed of the power input shaft and the relative rotational speed between the rotor and stator of the first generator.

9. An alternating current power generating system comprising:
a plurality of alternating current generators, each having rotatably mounted rotors and stators;
a rotatable power input shaft adapted to be driven by a prime mover at widely varying speeds;
the power input shaft being connected in driving relation to the first rotor;
the first stator being connected in driving relation to the second rotor;
the second stator being connected in driving relation to a controllable load;
a field control assembly for each generator electrically connected to its rotor to provide controlled excitation;
a load control assembly for each generator electrically connected to its stator;
lock means associated with each stator to prevent rotation;
a phase lock assembly electrically connected through its respective load control assembly to each respective stator to sense the frequency of the current produced by the generator, and electrically connected to its respective lock means;
and a source of reference voltage at a target frequency connected to each phase lock assembly;
the range of rotational speed of the power input shaft extending well above that required to produce the target frequency in at least one generator;
the first phase lock assembly being operative to sense the frequency of the current produced by the first generator and compare it with the target frequency and to act in response to the attainment of such frequency and release the first lock means to allow the first stator to rotate and maintain a relative speed between itself the first rotor corresponding to the target frequency and to drive the second rotor.

10. A system as claimed in claim 9; in which
the load control assembly is connected to a load to transmit the output of its generator to the load, and is operable to vary the load and maintain the proper operating condition of the generator.

11. A system as claimed in claim 10; in which
the load control assembly is selectively connectable to a first type of load to absorb the output of the generator at less than the target frequency and selected voltage.

12. A system as claimed in claim 10; in which
the load control assembly is selectively connected to a second type of load to absorb the output of the generator at the target frequency and selected voltage.

13. A system as claimed in claim 12; in which
the second type of load is a power supply system carrying current at the target frequency and selected voltage.

14. A system as claimed in claim 9; in which
the controllable load to which the second stator is connected is a dynamic brake.

15. A system as claimed in claim 9; in which
the controllable load to which the second stator is connected comprises at least one additional generator, with the stator of the last generator in the series being connected to a dynamic brake.

16. A system as claimed in claim 9; in which each stator is provided with a drive shaft;
a supporting bearing is provided for each drive shaft;
and the lock means is connected to the bearing and selectively operable to cause it to bind the drive shaft and prevent its rotation.

17. A system as claimed in claim 9; in which
the source of reference voltage at target frequency is a power supply system carrying current at selected voltage and target frequency.

18. A system as claimed in claim 9; in which
a rotatably mounted frame is provided for each stator;
and each stator is fixedly mounted in its frame for rotation with respect to its rotor.

19. A system as claimed in claim 9; in which
the components of the generators are arranged in concentric overlying relation;
the innermost component being the first rotor;
the second component surrounding the first rotor comprising the first stator and the second rotor;
and the third component surrounding the second component being the second stator.

20. The method of generating and supplying alternating current at a selected target frequency from a plurality of generators driven from a power input shaft having a range of rotational speed extending well above that required to produce the selected target frequency in at least one generator, the method comprising:
driving the rotor of a first generator from the power input shaft at increasing rotational speed until the generator produces current at the target frequency;
causing the stator of the first generator to rotate and maintain a relative rotational speed between itself and the rotor corresponding to the target frequency, with its absolute rotational speed being the difference between the rotational speed of the shaft and the relative rotational speed between the stator and the rotor;
driving the rotor of each successive generator from the stator of the preceding generator at increasing rotational speeds until such generator produces current at the target frequency;
and repeating the stator rotation and driving steps within the range of rotational speed of the power input shaft.

21. The method as claimed in claim 20; further including
selectively transmitting the output of each generator to a first type of load to absorb the output at less than the target frequency and a selected voltage and to a second type of load to absorb the output at the target frequency and selected voltage.

22. The method as claimed in claim 20; further including
transmitting the output of each generator to a load and varying the load to maintain the proper operating condition of the generator.

23. The method of generating and supplying alternating current at a selected target frequency from a generator driven from a power input shaft having a range of rotational speed extending well above that required to produce the selected target frequency in the generator, the method comprising:
driving the rotor of the generator from the power input shaft at increasing rotational speed until it produces current at the target frequency;
causing the stator of the generator to rotate and maintain a relative rotational speed between itself and the rotor corresponding to the target frequency, with its absolute rotational speed being the difference between the rotational speed of the shaft and the relative rotational speed between the stator and the rotor;
and causing the stator to drive the rotor of a second generator.

* * * * *